(12) United States Patent
Solomon

(10) Patent No.: US 6,966,984 B1
(45) Date of Patent: Nov. 22, 2005

(54) PRE-CAST DRIVE-DOWN WATER SEPARATION PIT SYSTEM

(75) Inventor: Michael A. Solomon, 8507-j Falls Run Rd., Ellicott City, MD (US) 21043

(73) Assignees: Michael A. Solomon, Ellicott City, MD (US); Geoffrey L. Fisher, Arlington, VA (US)

( * ) Notice: Subject to any disclaimer, the term of this patent is extended or adjusted under 35 U.S.C. 154(b) by 0 days.

(21) Appl. No.: 11/002,675

(22) Filed: Dec. 3, 2004

(51) Int. Cl.$^7$ ............................................ B01D 21/02
(52) U.S. Cl. ................. 210/154; 210/170; 210/299; 210/521; 210/532.1; 210/538; 134/104.2; 134/109; 52/169.7; 52/741.12
(58) Field of Search ............................. 210/154, 162, 210/170, 299, 521, 532.1, 538, 540; 134/109, 134/104.2, 104.4; 52/741.12, 169.7

(56) References Cited

U.S. PATENT DOCUMENTS

| | | | |
|---|---|---|---|
| 357,349 A * | 2/1887 | Waring ................... 210/532.1 |
| 745,870 A * | 12/1903 | Lowe ..................... 210/532.1 |
| 1,654,073 A * | 12/1927 | Fagan ....................... 52/169.7 |
| 3,727,707 A | 4/1973 | Machala |
| 5,011,609 A | 4/1991 | Fink |
| 5,108,609 A * | 4/1992 | Burt ....................... 210/532.1 |
| 5,228,983 A * | 7/1993 | Nims ....................... 210/521 |
| 5,587,065 A | 12/1996 | Burns |
| 5,597,001 A * | 1/1997 | Rasmussen et al. ..... 134/104.2 |
| 5,746,912 A * | 5/1998 | Monteith ................. 210/170 |
| 5,779,888 A * | 7/1998 | Bennett ................... 210/170 |
| 6,077,448 A * | 6/2000 | Tran-Quoc-Nam et al. ................. 210/532.1 |
| 6,247,480 B1 * | 6/2001 | Wegner ................... 210/538 |
| 6,655,396 B2 * | 12/2003 | Krenzel ................. 134/104.4 |
| 2002/0121293 A1 * | 9/2002 | McCormick et al. ....... 134/109 |
| 2004/0098931 A1 | 5/2004 | Sanders |

FOREIGN PATENT DOCUMENTS

| JP | 51-140371 | 12/1976 |
|---|---|---|
| JP | 11-256858 | 9/1999 |

* cited by examiner

Primary Examiner—Christopher Upton
(74) Attorney, Agent, or Firm—Richard C. Litman

(57) ABSTRACT

A unitary or modular, pre-cast, drive-down pit system suitable for use in a heavy equipment wash installation. The completed pit collects runoff generated by the washing of heavy equipment such as construction, industrial, farming, or road-building equipment. The pre-cast concrete separation unit and separate wall sections have tongue and groove mating ends that facilitate assembling the pit and provide for sealing against leakage of water. The wall sections have built-in rebar attachment and water block elements at an angle so as to provide for a strong and waterproof bond with the ramp floor. The ramp floor is concrete, poured after installation of the separation unit and the wall sections to complete the finished drive-down pit. The separation unit has up to four chambers: a primary solids collection section; a secondary solids settling chamber; a free oil separating section; and a pump water holding section.

26 Claims, 13 Drawing Sheets

PRE-CAST DRIVE-DOWN WATER SEPARATION PIT SYSTEM

BACKGROUND OF THE INVENTION

1. Field of the Invention

The present invention relates to solids and free oil/water separation devices. More particularly, the present invention relates to a pre-cast unitary or modular assembly forming a pit for the pretreatment of water in a washpad installation for construction equipment and the like.

2. Description of the Related Art

Recent legislation has imposed strict limitations on the release of pollutants. This is particularly true in sensitive watershed areas such as that for the Chesapeake Bay watershed area. Construction equipment, road building equipment, farm equipment, and the like tend to collect oil and grease on their surfaces, along with dust and dirt, some of which clings to the oil-covered surfaces. It is necessary to periodically wash this equipment with pressure washers, resulting in wash water polluted with dirt, gravel, stones oil, and greases. It is also desirable to recycle the wash water for use in the pressure washers.

In response to the environmental requirements, it has become common practice to provide a drive-down pit for separating the wash water from dirt, stones, and gravel by settling, and oil and grease by consumption with enzymes or use of skimmers. This pretreatment of the wash water is necessary, regardless of the type of equipment being used for the recycling and/or discharge of the wash water. Such pits have a primary separation section where stones, gravel, and clumps of dirt are allowed to sink to the bottom. It is necessary to periodically remove such coarse material by providing a ramp for driving down a front-loading tractor into the water-containing pit and removing this material by manipulating the bucket of the tractor and backing out of the pit up the ramp.

The free oil and grease float to the water surface and is captured and then consumed by enzymes placed in table form in the pit or skimmed from the pit and removed for proper disposal. The enzymes are effective during summer months, while skimming is used in colder weather. Pretreated water is pumped from the pit as dirty water drains into the pit from the wash pad. The pretreated water is further cleaned by various types of separation equipment to be recycled to the pressure washers or discharged.

It typically takes two to three weeks to build forms and pour the concrete to complete the construction of the floor, walls, and ramp of such a pit, costing valuable labor time and delaying the use of a wash installation. Water leakage is a problem due to the multiple pours required, which may undermine the pit. It would be desirable to provide a unitary or modular pit system which can be customized for any pretreatment requirements and which can be quickly installed with the elimination or minimization of concrete pouring. Such a system would eliminate the need for building concrete casting forms and eliminate water leakage.

Thus a pre-cast drive-down pit system solving the aforementioned problems is desired.

SUMMARY OF THE INVENTION

The present invention is a unitary or modular, pre-cast, drive-down pit system suitable for use in a heavy equipment wash installation. The installed pit collects runoff generated by the washing of heavy equipment such as construction, industrial, farming, or road-building equipment. The modular system has a pre-cast concrete separation unit and a drive-down section. The drive-down section has separate modular walls having tongue and groove mating ends for mating with the separation unit. The tongue and groove mating ends facilitate assembly of the pit and provide for positive sealing against leakage of water. The walls have built-in rebar attachment and water block elements at a predetermined angle so as to provide for a strong and waterproof bond with the ramp floor. The ramp floor is concrete, poured after installation of the separation unit and the wall sections to complete the finished drive-down pit. The separation unit has up to four chambers: a primary solids collection chamber; a secondary solids settling chamber; a free oil separating chamber; and a sump pump chamber. The unitary system includes the separation unit and the drive-down section cast of concrete as a single unit.

The separation unit design provides for a hydraulic line depth to accommodate the apparatus to remove heavy solids. This depth is determined by overflow dams for flow of water successively traveling between the separation chambers, the free oil separating chamber having a standpipe and conduit for feeding the sump pump chamber of the separation unit. The separate wall sections feature an inner surface with a vertical face and an outer surface having an outward protruding footing or base. The modular nature of the pre-cast collection and separation pit of the present invention allows a quick leak-proof installation for the collection and pretreatment of water from a washing pad.

It is an aspect of the invention to provide improved elements and arrangements thereof for the purposes described which is cost effective, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is unitary or a modular, pre-cast, drive-down pit system suitable for use in a heavy equipment wash installation.

Figure 1:
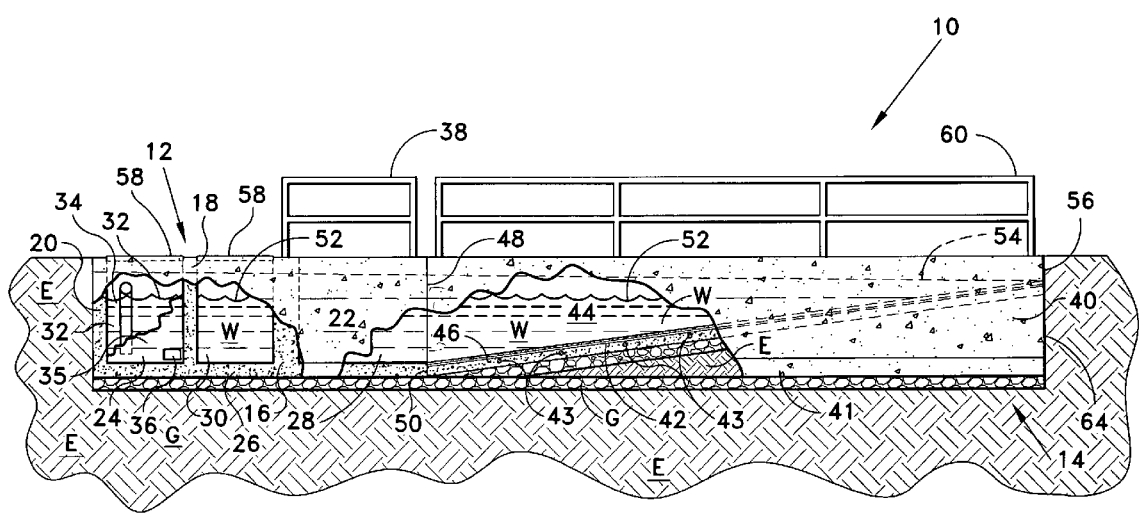
FIG. 1 is an environmental side elevation view partially broken away, of the modular drive-down water separation and purification pit of the present invention.

Referring to FIG. 1, there is shown a side elevation, view, partially broken away, of the modular drive-down pit system of the present invention as installed, generally referred to by the reference No. 10. Modular drive-down pit system 10 includes a generally rectangular separation unit 12 and pit wall units 14. Water separation unit 12 has a front wall 16, an intermediate wall 18 and a rear wall 20, all between sidewalls 22. Sidewalls 22 extend equally and substantially forward of separation unit front wall 16. A rear longitudinal wall 24 is parallel to and spaced from sidewalls 22, extending between intermediate wall 18 and rear wall 20. Separation unit 12 has a horizontally disposed floor 26 extending from the front ends of sidewalls 22 to the rear wall 20 to form an integral unit.

The forward portions of sidewalls 22 and floor 26 define a primary solids separation section 28 for separating heavy components from the wash runoff water entering pit 10 through settling. The front wall 16, intermediate wall 18, sidewalls 22, and floor 26 define secondary solids separation section 30 for separating finer dispersed solids from the water through settling. Rear longitudinal wall 24 separates the section formed defined by intermediate wall 18, rear wall 20, sidewalls 22 and floor 26 into an oil separation section 32 and a sump pump section 35.

An oil separation standpipe and exit conduit 34 extends from a point proximate the floor of oil separation section 32 and connects oil separation section 32 with sump pump section 35 at hydraulic level 52. A submersible pump 36 is located in sump pump section 35 for removal of the pretreated water from the pit system 10. Water separation unit 12 has a handrail 38 extending along the upper surface of sidewalls 22 and front wall 16 to surround primary solids separation section 28.

The sidewalls of pit wall units 14 each have an outward-extending footer 41 along the lower portions of respective pit wall units 14. Each sidewall 40 has an imbedded ramp waterblock element 42 extending inward along a sloping angle from the forward end 64 to the connection joint 48 connecting water separation unit 48 and pit wall units 14. A series of rebar connectors 43 are embedded in each sidewall below waterblock element 42 and spaced therealong. A concrete ramp 46 is poured over a gravel bed G and backfill earth E to form a ramp section 44 and complete the installation of the modular drive-down water pretreatment pit 10.

As shown, the ramp 46, as poured, seals over waterblock 42 making a watertight joint. Rebar (not shown) is attached between the rebar connectors 43 extending from opposite sidewalls 40 of pit wall units 14 before pouring the concrete of ramp 46 for reinforcement of the ramp. A connection 50 is made between separation unit floor 40 and ramp 46 upon pouring the ramp 46. The gradation of the wash pad is shown in hidden line 54 along the upper portion of drive-down pit 10. Each pit wall unit 14 has a handrail 60 extending along its respective upper edge. Water runoff from the wash pad enters the pit 10 at runoff water entry 56. Separation unit cover grates 58 cover the secondary solids separation section 30, the oil separation section 32, and the sump pump section 35.

Figure 2A:
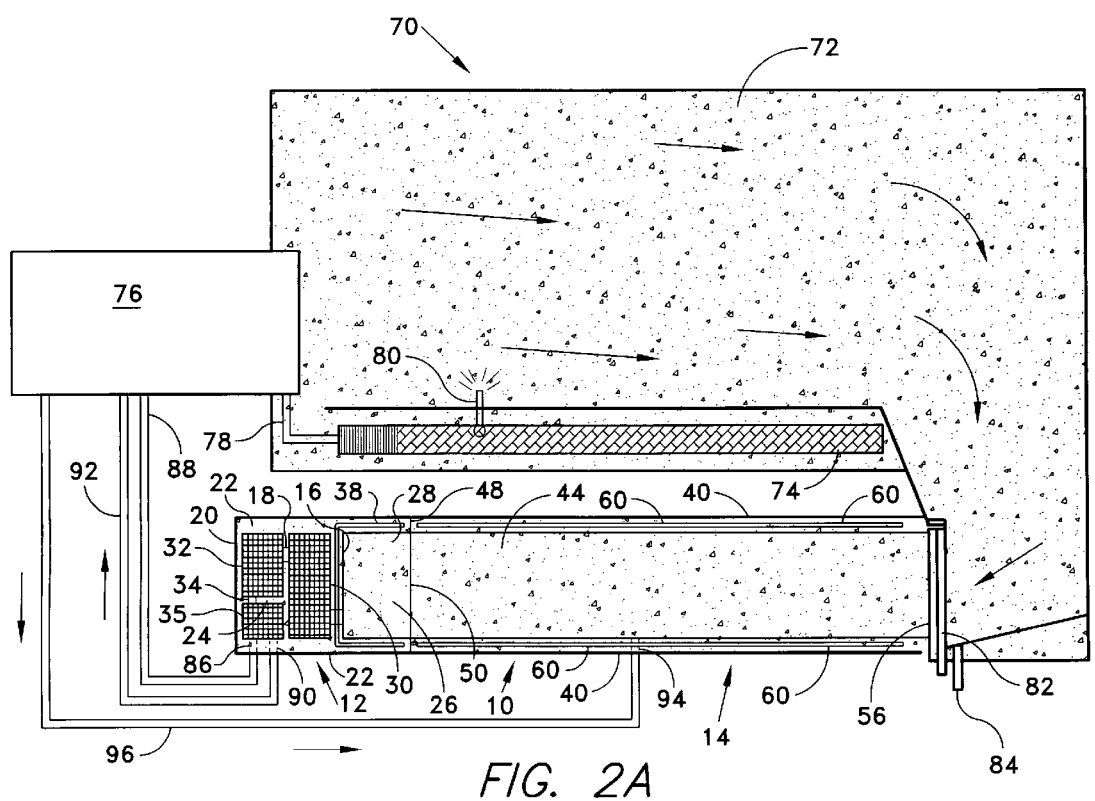
FIG. 2A is a plan view of the pit installation of FIG. 1, with an equipment room such as a pump and filter facility and wash pad.

Referring to FIG. 2A there is shown a plan view of a construction equipment wash installation having a wash pad and circulation system 70 shown in connection with the inventive modular drive-down water pretreatment pit 10. Wash pad and circulation system 70 has a sloping wash pad 72, preferably of concrete. A catwalk 74 divides the wash pad 72 and the pit 10 for ease in pressure washing of equipment by a workman. An equipment room 76 contains pumps, filters, and conduits of conventional configuration for final filtering of recycle water from pit 10, supplying wash nozzle supply line 78 and wash nozzle 80 with filtered water for washing equipment parked on wash pad 72. A rainwater diverter 82 is put in place when the pit and circulating system are not in use to divert rainwater draining from pad 42 to pit 10. A closure 84 is placed so as to complete the channel between the pad 72 and pit 10 at runoff water entry 56 when the rainwater diverter 82 is removed for washing operations.

An electrical pump service conduit 88 is connected with pump 36 through pump electrical service aperture 86 in the sidewall 22 of pump water collection section 35 for electrical service supplied from pump and filter facility 76. A pump water conduit 92 conducts water from sump pump 36 through pump water conduit aperture 90 in sidewall 22 and into equipment room 76. A filter flush return conduit 96 extends from pump and filter facility 76 and through filter flush return line aperture 94 in sidewall 40 so as to return water used in periodic flushing of filters to ramp section 44 for separation of solids from the flush water. Apertures 86 and 90 may be located in rear wall 20 as desired and the unit 12 may be supplied with both pairs of apertures, each filled with knockout plugs for fitting different size conduits.

Figure 2B:
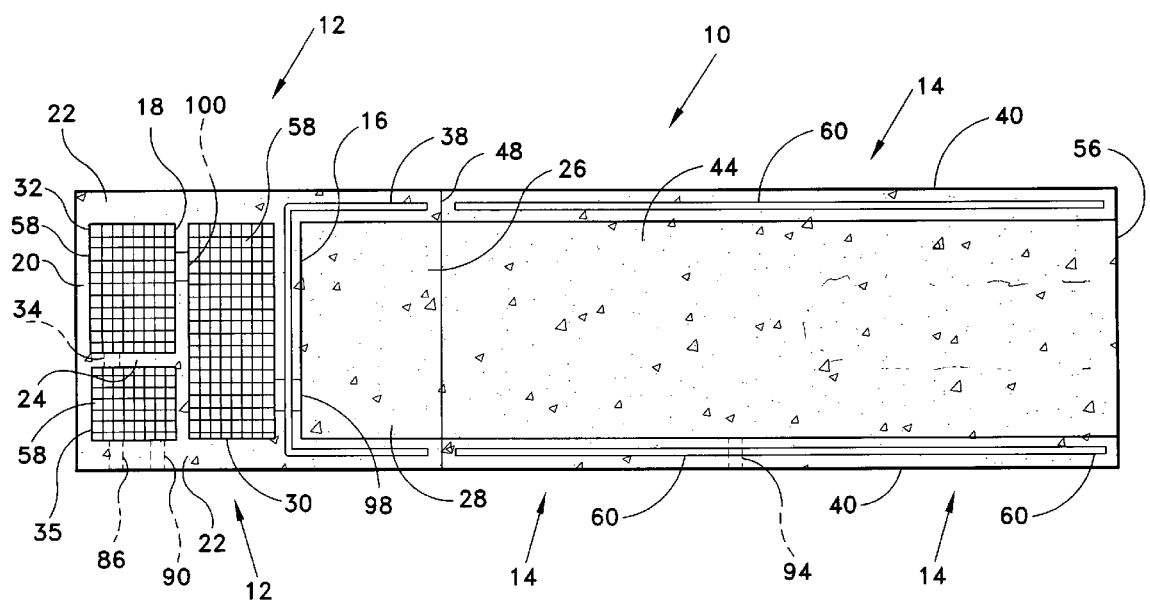
FIG. 2B is a plan view of the drive-down water separation pit of FIG. 1 with grates and railing in place.

Referring to FIG. 2B there is shown a plan view of the modular drive-down heavy solids separation pit 10. A stream of water, lighter solids, and free oil flows from primary solids separation section 28 over cutout dam 98 in front wall 16 at the hydraulic fill level (see hydraulic fill line 52 of FIG. 1) and into secondary solids separation section 30. The water and free oil then flow over cutout dam 100 at the hydraulic fill level and into oil separation section 32. The oil floats and collects on the surface of the water while water flows up through the standpipe of standpipe and conduit 34, and through the conduit to pump water collection section 35. Grates 58 are shown covering sections 30, 32, and 35 for safety. Handrails 38 and 60 surround the primary solids separation section 28 and the pit wall units 12 for safety.

Figure 3:
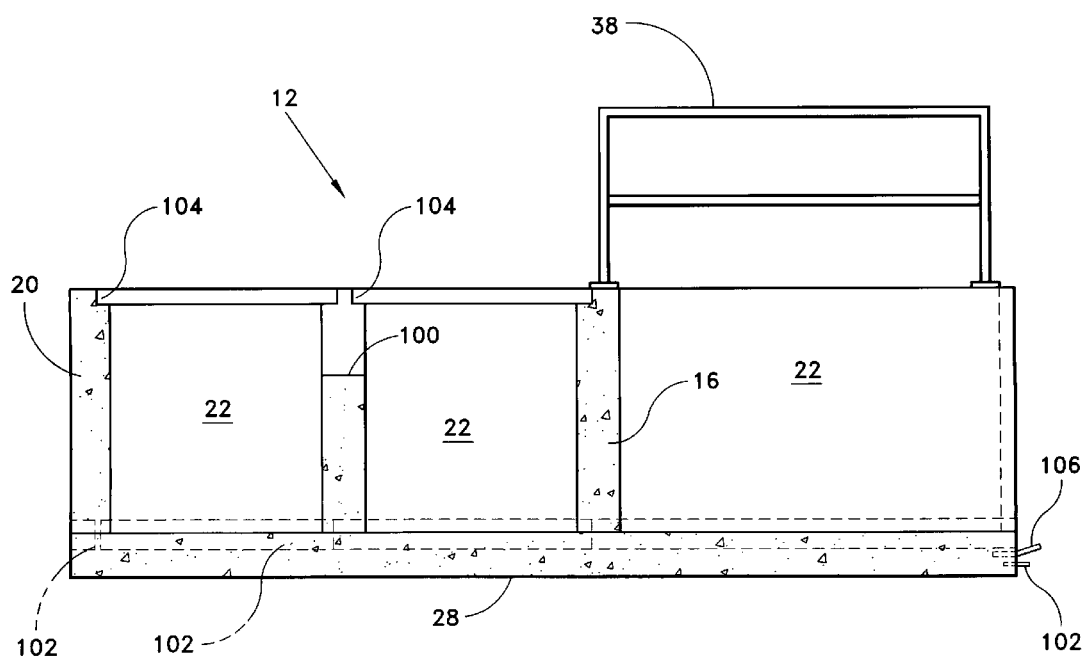
FIG. 3 is a sectional view of the water separation unit of FIG. 1.

Referring to FIG. 3, there is shown a sectional view of the water separation unit 12. The oil separation section feed cutout dam 100 is shown providing access between secondary solids separation section 30 and oil separation section 32. Separation unit grating ledges 104 are shown cut into walls 16, 18, 29 and sidewall 22. Water block strips 102 are shown as hidden lines between the floor 28 and outer walls including rear wall 20 and sidewalls 22. Another water block strip 102 is embedded in the floor 28 at connection joint 50 (see FIG. 1). A series of spaced rebar connections 106 are embedded in floor 28 at points spaced above water block strip 102 (see FIG. 4C). These rebar connections 106 may be located above the water block element 102 as an alternative. The floor of concrete ramp 46, when poured, surrounds the water block strip 102 forming a waterproof joint. Rebar may be attached to rebar connection 106 and extended at an angle upward to reinforce the ramp 46 when poured with cement.

This rebar may be attached at right angles to the crosswise rebar described as attached to ramp rebar connectors 43 as discussed above (see FIG. 1).

Figure 4A:
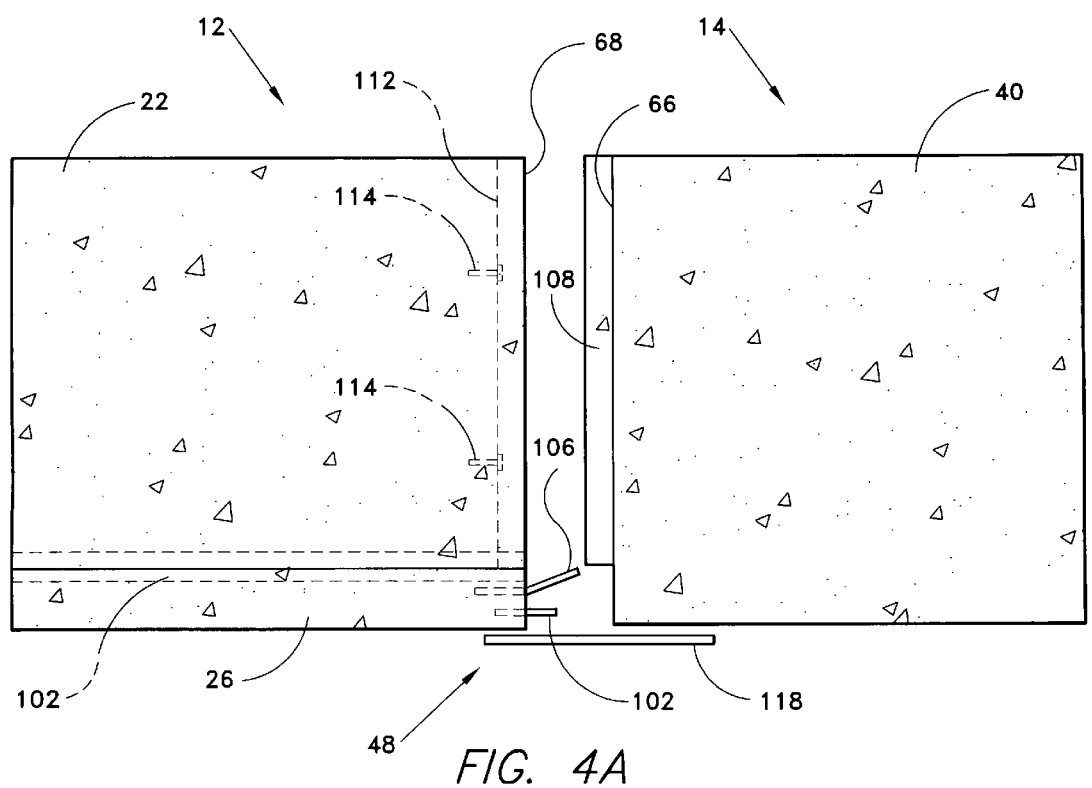
FIG. 4A is a detail view of the water separation unit connection with a drive-down wall unit of FIG. 1 prior to assembly.
Figure 4B:
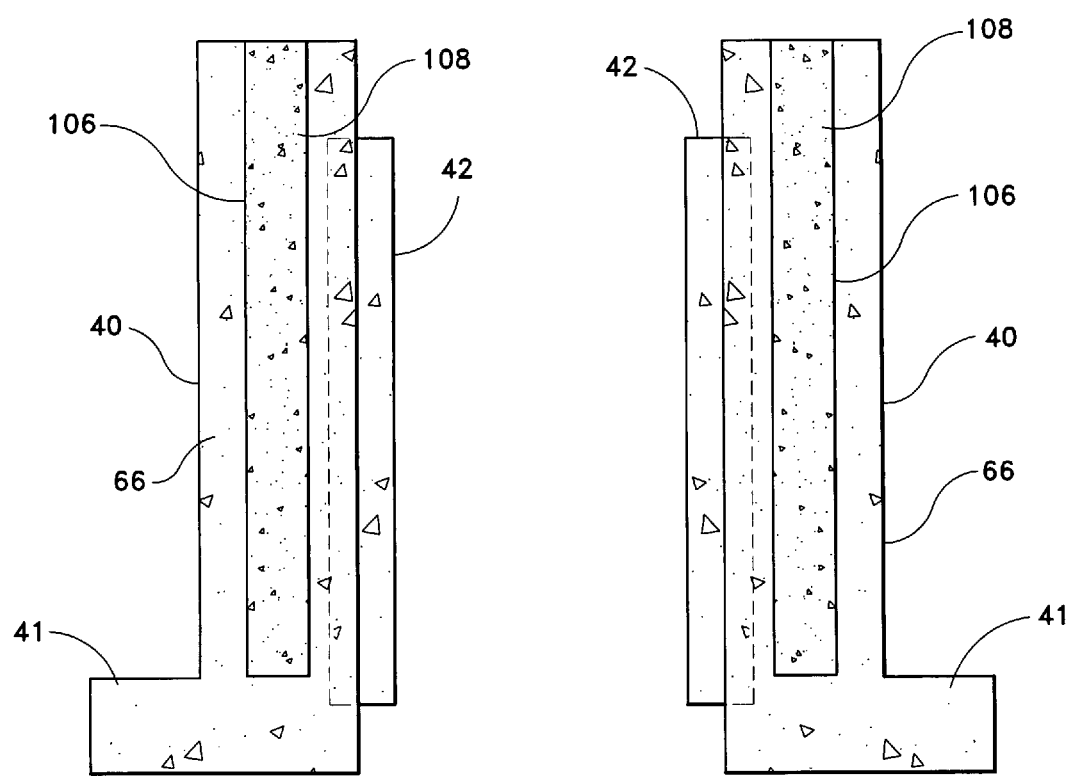
FIG. 4B is an end view of the drive-down pit wall units of FIG. 1.
Figure 4C:
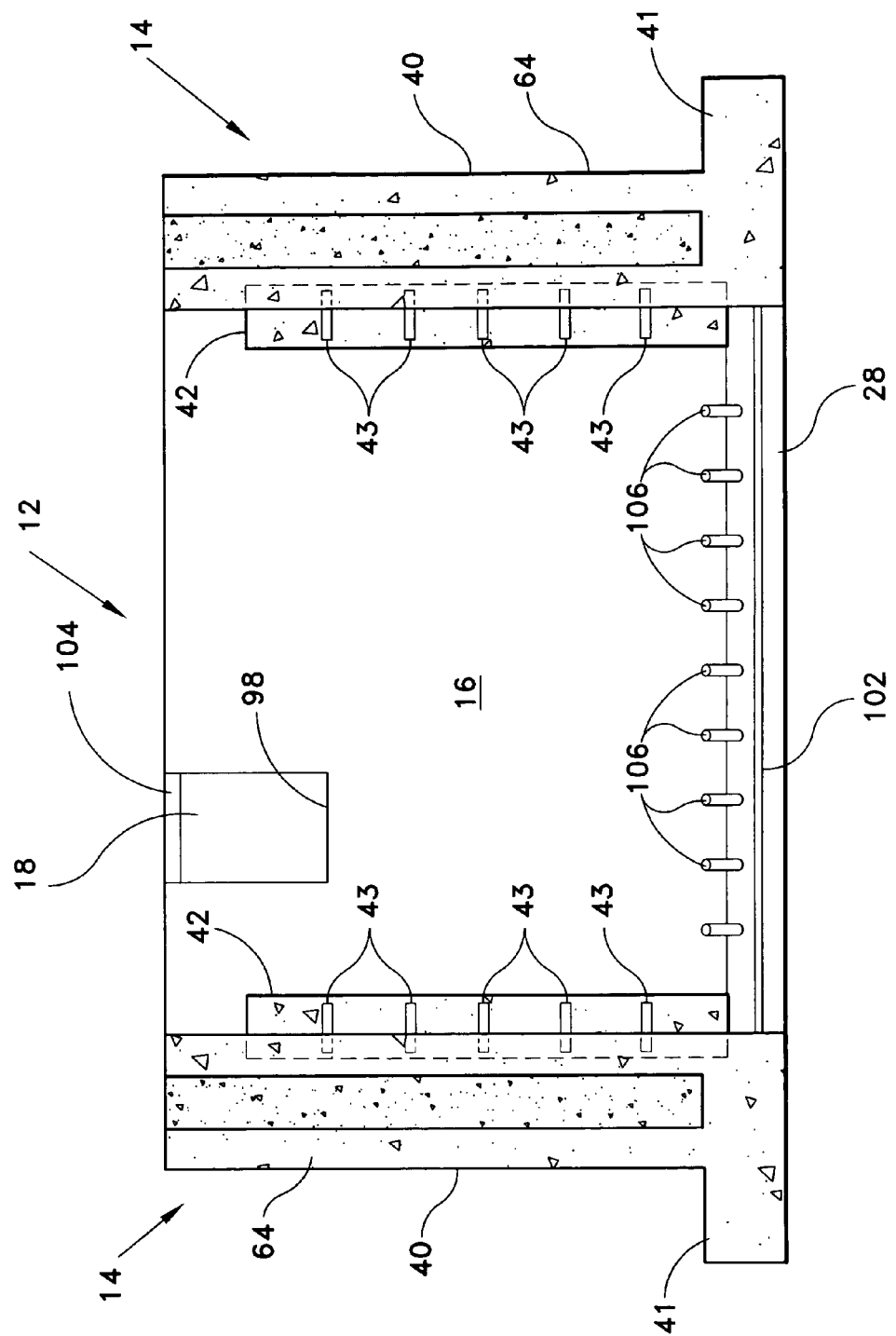
FIG. 4C is a front elevation view of the pit wall units and water separator unit as joined and before construction of ramp.
Figure 5:
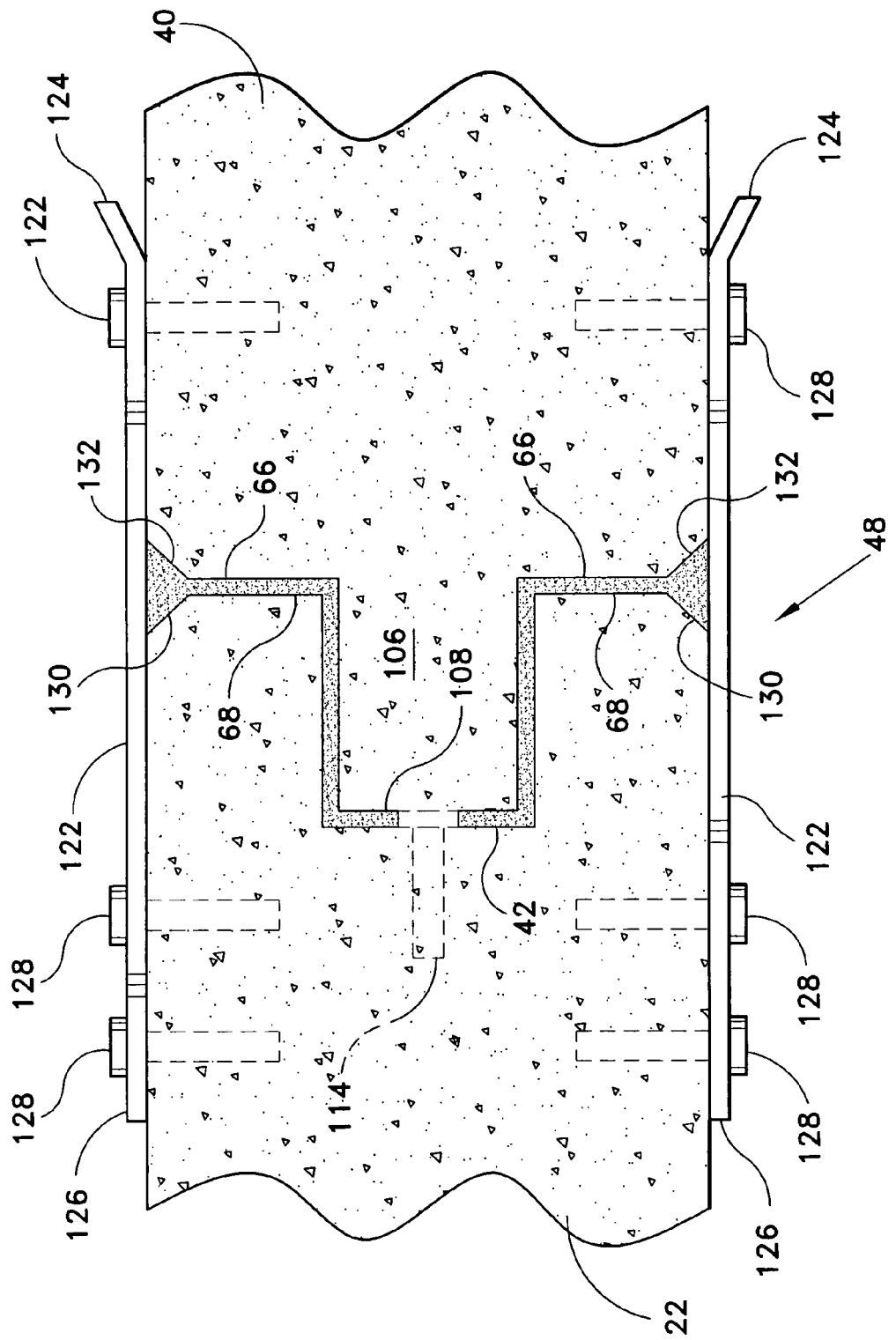
FIG. 5 is a detail view of the connection of the water separation unit and the drive-down pit wall unit of FIG. 1 in plan view.

Referring to FIGS. 4A–4C and FIG. 5, there is shown a side elevation view illustrating the wall connection 48, a rear elevation view of the spaced pit wall units 14, a front elevation view of the assembled pit wall units 14 and separation unit 12 as assembled, and a detail plan view of the wall connection 48, respectively. As seen in FIGS. 4A and 5, each wall 40 of pit wall units 14 has a tongue 110 extending rearwardly along its rear end 66. Separation unit sidewalls 22 each have a groove 112 at its forward end 68. Groove 68 extends to the floor 26 of separation unit 12. Steel skid plates 118 are located below the joint to allow easy assembly of tongue 110 into groove 112. Spacing bolts 114 are imbedded into groove 114, the heads of which act as spacers within the joint 48 for sealant 134.

Steel securing guide straps 122 are mounted on opposite sides of each wall 22 and extend forwardly from separation unit sidewall forward ends 68 having flared guide ends 124 for receiving and centering walls 40 of pit wall units 14. Guide straps 122 are mounted into walls 22 by securing bolts 128. Once walls 40 are mated with walls 22, additional securing bolts 128 are introduced through guide straps 122 and secured into walls 40. Chamfers 130 at the outer corners of walls 22 and chamfers 132 at the outer corners of walls 40 expedite the introduction of sealant 134 to form a waterproof joint 48.

As best seen in FIG. 4C, water block strips 102 are embedded in the front end of floor 28 and extends between footers 41 of sidewalls 40. Also, rebar connections 106 are embedded in the front end of floor 28 and extend forward and upward therefrom. The rebar connections are spaced along floor 28 between footers 41 of sidewalls 40. The rebar connections 43 are embedded in walls 40 and spaced below embedded water blocks 42 of pit wall units 14. Cutout dam 98 in water separation unit front wall 16 establishes the hydraulic level(see FIG. 4) and allows water, free oil, and fine disperse solids to pass from the primary solids separation section into the next secondary solids separation section.

Figure 6:
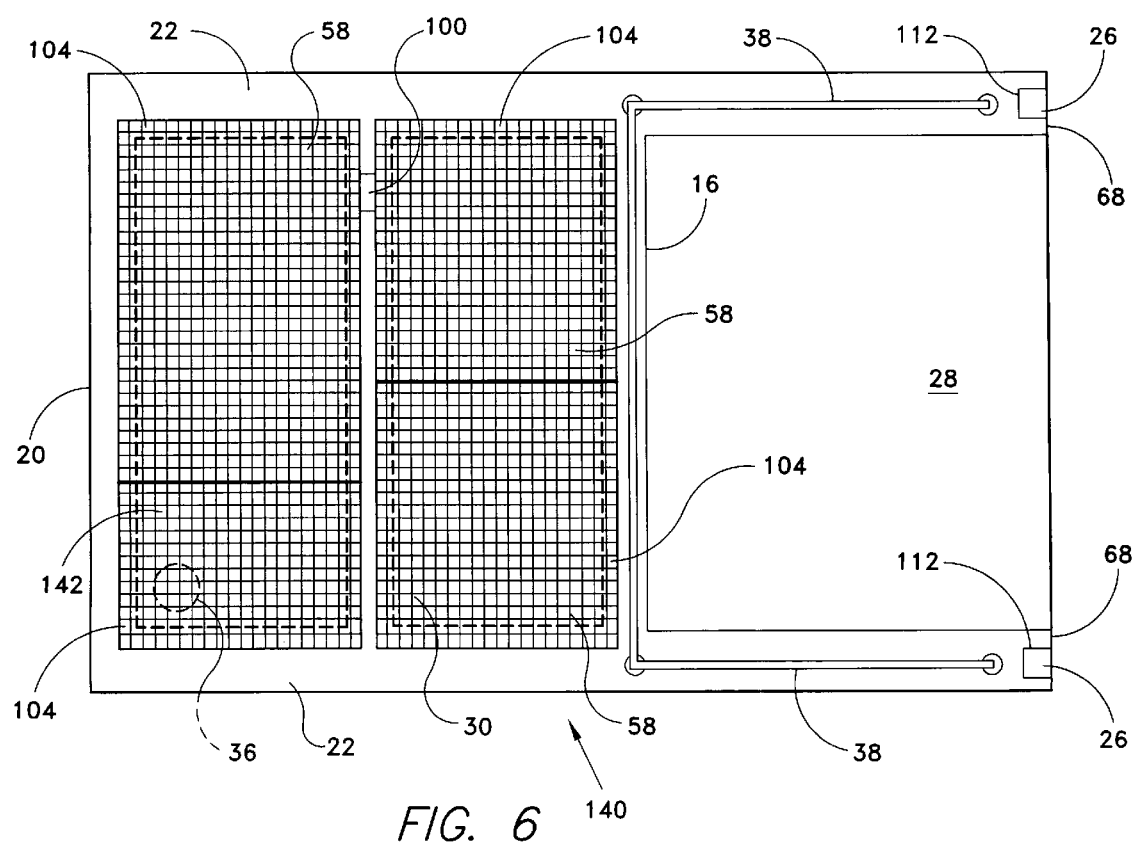
FIG. 6 is a plan view of another embodiment of the water separation unit of the invention.

Referring to FIG. 6, there is shown a plan view of another embodiment of the water separation unit of the present invention referred to by the reference No. 140. Water separation unit 140 is identical in construction and features as water separation unit 12 described above with the exception that there is a single section 132 acting as a free oil separation section and a pump water collection section, the pump 30 being at the side opposite the feed cutout dam 100. There is no wall comparable to the rear longitudinal wall 24 and no standpipe and conduit 34 as in the water separation unit 12. Enzyme tablets or skimming is used for free oil removal and the submerged pump 30 pumps treated water from the lower portion of the section 142. A large grate 58 covers the entire oil separation and pump water section 132.

Figure 7:
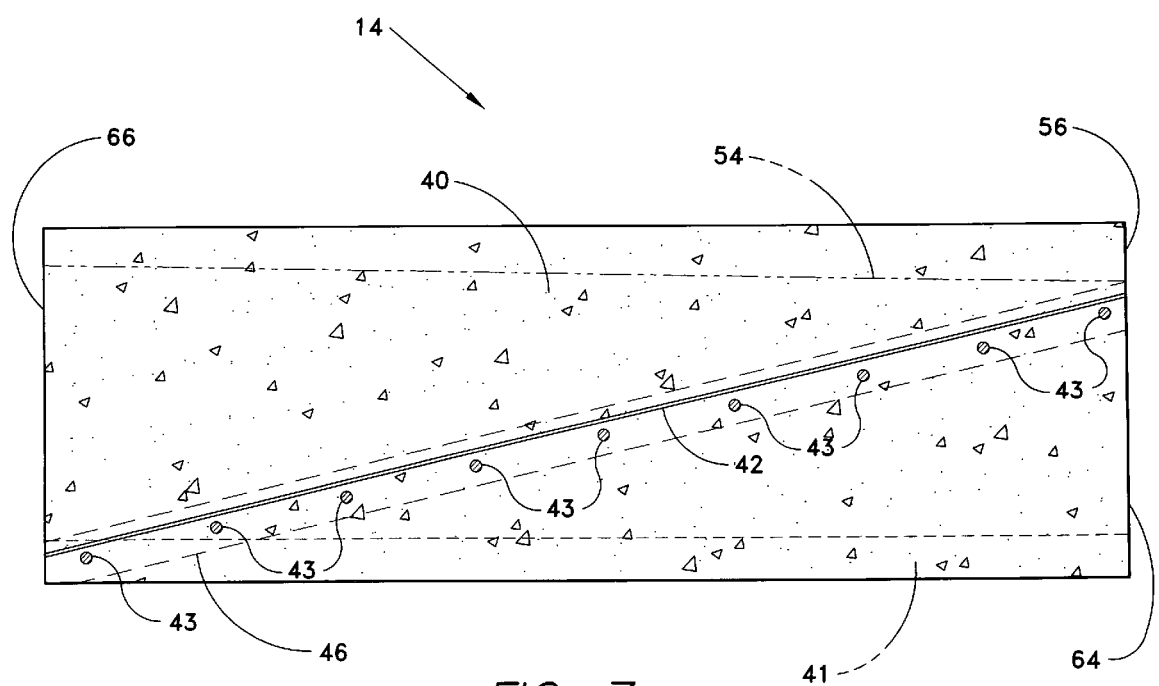
FIG. 7 is a side elevation view of the drive-down pit wall unit of FIG. 1.

Referring to FIG. 7, there is shown a side elevation view of the inner side of wall 40 of a pit wall unit 14. Waterblock 42 is embedded in cement wall 40 and slopes downward from wall forward end 64 to wall rear end 66. Imbedded rebar connectors 43 are shown spaced along and under waterblock 42. The concrete ramp 46 to be poured is shown in ghost lines. The washpad grade line 54 leads to the wash water runoff entry 56.

Figure 8:
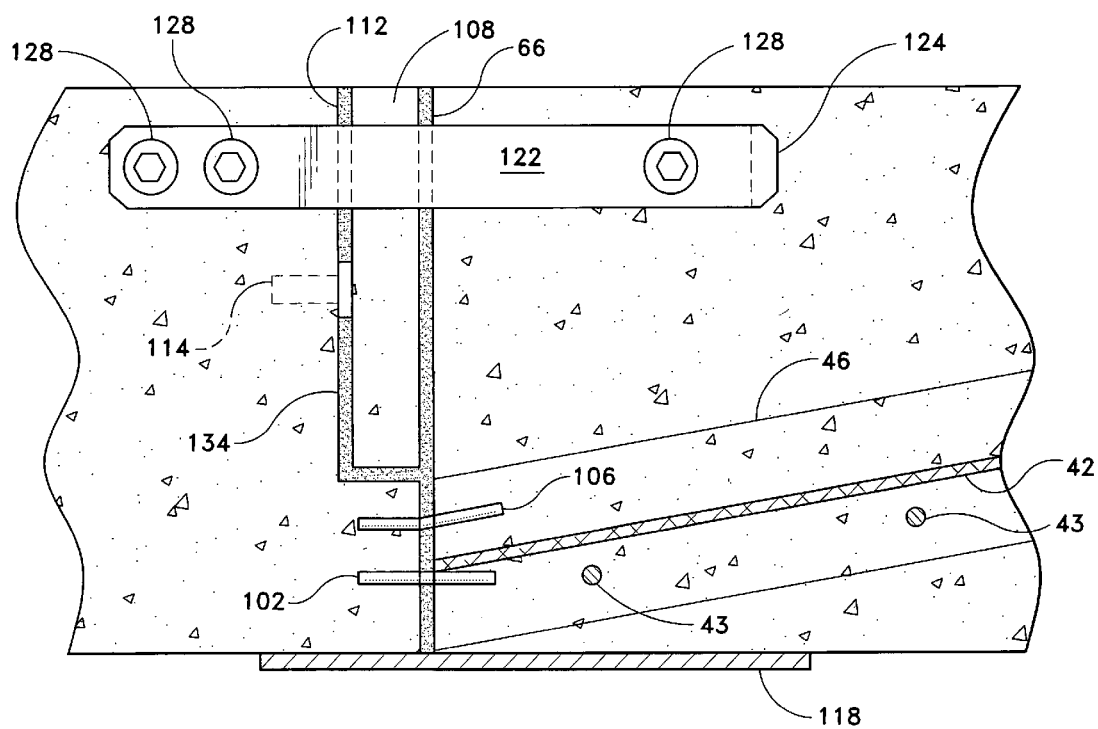
FIG. 8 is a diagrammatic detail view in elevation of the finished connection between the water purification unit, the drive-down pit wall unit, and the poured ramp of FIG. 1 as joined.

Referring to FIG. 8, there is shown a diagrammatic detail view of the completed joints 48 and 50 of FIG. 1. Concrete ramp 46 has been poured with waterblock strip 42 and rebar connection 43 extending into the poured concrete ramp 46. Waterblock strip 102 is recessed in the forward edge of separation unit floor 26 (see FIGS. 3 and 4C) and the extreme rear end of waterblock strip 42 bears against strip 102 to form a waterproof joint. Rebar connectors 106 is embedded in the forward edge of separation unit floor 26 and engages the poured concrete ramp 46 (connected rebar extending from rebar connectors 43 and 106). Sealant 134 surrounds tongue 108 on three sides and then extends inward and outward between wall rear end 66 and separation unit tongue receiving groove separation unit sidewall forward ends 68 (see FIG. 5). The head of spacing bolt 114 provides spacing for sealant 134. Securing guide straps 122 secure sidewall 22 to wall 40.

Figure 9:
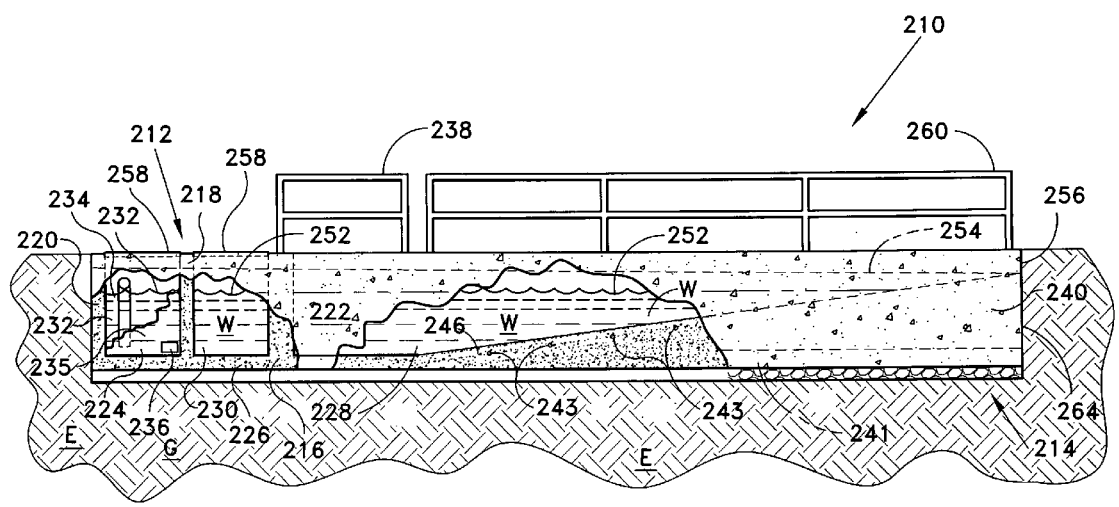
FIG. 9 is an environmental side elevational view, partially broken away, of another embodiment of the present invention.
Figure 10:
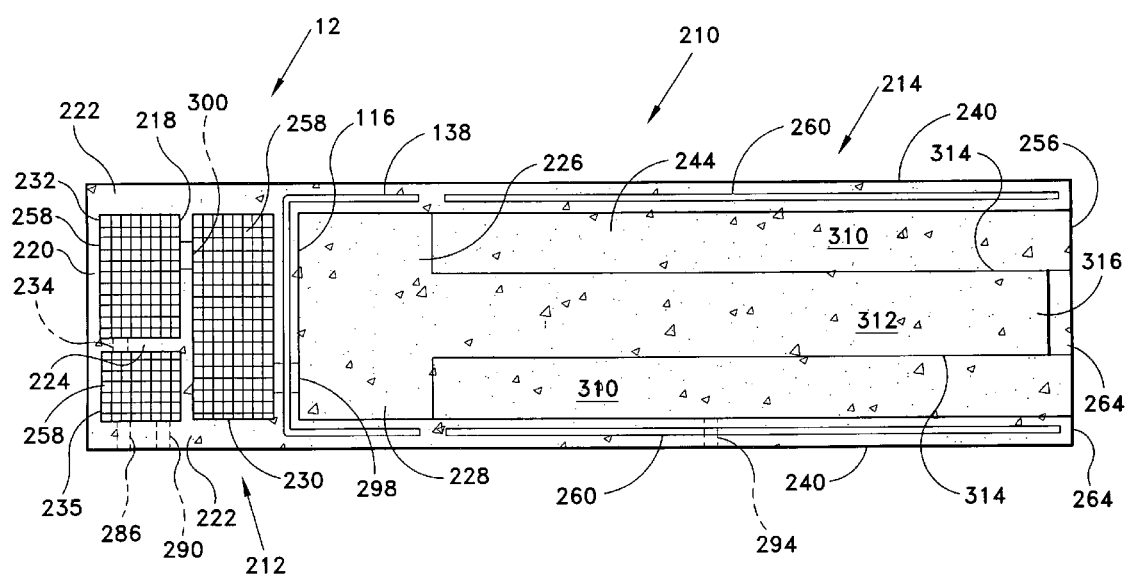
FIG. 10 is a plan view of the embodiment of FIG. 9.

Referring to FIGS. 9 and 10, there is shown a side elevation view, partially broken away, and a plan view, respectively, of another embodiment of the drive-down pit system of the present invention as installed, which is precast as a single unit generally referred to by the reference No. 210. Unitary drive-down pit system 210 includes a generally rectangular separation section 212 and a drive-down section 214. Water separation section 212 has a front wall 216, an intermediate wall 218 and a rear wall 220, all between sidewalls 222. Sidewalls 222 extend equally and substantially forward of separation section front wall 216. A rear longitudinal wall 224 is parallel to and spaced from sidewalls 222, extending between intermediate wall 218 and rear wall 220. Separation section 212 has a horizontally disposed floor 226.

The forward portions of sidewalls 222 and floor 226 define a primary solids separation section 228 for separating heavy components from the wash runoff water entering pit 210 through settling. The front wall 216, intermediate wall 218, sidewalls 222, and floor 226 define secondary solids separation section 230 for separating finer dispersed solids from the water through settling. Rear longitudinal wall 224 separates the section formed defined by intermediate wall 218, rear wall 220, sidewalls 222 and floor 226 into an oil separation section 232 and a sump pump section 235.

An oil separation standpipe and exit conduit 234 extends from a point proximate the floor of oil separation section 232 and connects oil separation section 232 with sump pump section 235 at hydraulic level 252. A submersible pump 236 is located in sump pump section 235 for removal of the pretreated water from the pit system 210. Water separation section 212 has a handrail 238 extending along the upper surface of sidewalls 222 and front wall 216 to surround primary solids separation section 228.

For construction purposes, rebar loops or the like (not shown) may be embedded as attachments for grasping by a crane in the upper wall surfaces of the water separation section and the drive-down section 214. These attachments may by cut away after installation.

Drive-down section sidewalls 240 extend forward from the front portions of separation section sidewalls 222, and drive-down section floor 241 extends forward from the front portion of separation section floor 226(see FIG. 10). Imbedded rebar 243 is shown reinforcing ramps 246 and may be employed throughout the structure of unitary drive-down pit 210 as desired. Drive-down section ramps 246 extend inward from sidewalls 240 and are spaced by drive-down void section 312 forming inner ramp sidewalls 314 extending upward from drive-down void floor 316. Drive-down section ramps 246 slope downward from wash pad entry 256 in drive-down front wall 264 ending at separation section 212. Drive-down section void floor 316 extends rearward from front wall 264 and joins separation section floor 226. Drive-down void section 312 reduces the weight and materials requirements of the unitary pre-cast separation pit 210. The treads or tires of a front load vehicle bridge the drive-down void section 312 and are supported by drive-down ramps 246 during vehicle entry, solids oval, and vehicle exit.

The gradation of the wash pad is shown in hidden line 254 along the upper portion of unitary drive-down pit 210. Each pit wall 214 has a handrail 260 extending along its respective upper edge. Water runoff from the wash pad enters the pit 210 at runoff water entry 256. Separation unit cover grates 258 cover the secondary solids separation section 230, the oil separation section 232, and the sump pump section 235.

Referring more particularly to FIG. 10, a stream of water, lighter solids, and free oil flows from primary solids separation section 228 over cutout dam 298 in front wall 216 at the hydraulic fill level (see hydraulic fill line 252 of FIG. 9) and into secondary solids separation section 230. The water and free oil then flow over cutout dam 300 at the hydraulic fill level and into oil separation section 232. The oil floats and collects on the surface of the water while water flows up through the standpipe of standpipe and conduit 234 and through the conduit to sump pump water collection section 235. Grates 258 are shown covering sections 230, 232, and 235 for safety. Handrails 238 and 260 surround the primary solids separation section 228 and the drive-down section 212 for safety.

Pump electrical service line aperture 286, pump water line aperture 290 and secondary solids section feed conduit 298 are optionally pre-cast in unitary drive-down pit 210 to serve the same functions as electrical service line aperture 86, pump water line aperture 290, and secondary solids section feed conduit 98 as described above in the embodiment of FIG. 2b.

The pre-cast unitary or modular units may be of any desired size to form a pit with appropriate capacity. As an example, the overall length of the pit may be 432" with a water separation unit length of 144" and pit wall unit lengths of 288". The overall height of the pit is 42" and the width is 102". The water separation unit has a floor, front wall, intermediate wall and rear wall of 6" in thickness. The water separation unit sidewalls are 6"–8" in thickness as are the walls of the pit wall units. The ramp has a slope of 1¼' per lineal foot. The wash pad grade has a slope of ⅛" per liner foot.

The length of the primary solids separation section is 54". The length of each of the secondary solids separation section, the free oil separation section, and the pump water collection section is 36", respectively. The width of the primary and the secondary solids separation sections is 86", respectively. The free oil separation section is 4'10" and the pump water collection section is 30" in width, respectively. The steel skid plates under each pit wall joint is ½"×12"×24" steel plate. The tongue of the pit wall joint is 2½" in width by 3" in length by 41¾" in height and extends to the top surface of the pit wall unit.

The depth of the groove in the forward ends of the water separation unit sidewalls is 3" and the height is 42". The grate size of the secondary solids separation section is 39½ by 89½". The spacer bolts are ½"×1½" hex head bolts having heads of ¼" in thickness, providing for ¼" joint sealant space. The rebar is #6 rebar. The water block is plastic or robber strip of 4" width by ¼" thickness. The footers of the pit wall units extend 6" outward from the foot of the walls and are 6" in height, extending the length of the pit wall units. The hydraulic level in the pit is 24" above the floor of the water separation unit and the section feed cutout dams are 24" above the floor. The water entrance to the pit is 11" below the top surface of the pit wall units. The poured surface of the ramp is six inches in thickness. The joint securing guide straps are 18"×2"×¼" steel.

In the operation of the pit, solids collected in the primary solids separation section is periodically removed by scooping with the scoop of a tractor as described above. The secondary solids separation section is emptied of collected fines be a pit cleaner suction device which transfers the collected fines to the primary solids separation unit. Enzyme tablets used to consume the collected oil are, for example, Biopucks, available from Landa cleaning systems, Camas, Wash.

It is to be understood that the present invention is not limited to the embodiments described above, but encompasses any and all embodiments within the scope of the following claims.

We claim:

1. A pre-cast, modular, drive-down pit system for water separation, comprising:
   a pre-cast water separation unit comprising:
      opposing sidewalls having forward ends;
      a floor coextensive with said sidewalls and having a forward end;
      a front wall extending between said sidewalls and spaced rearward of said sidewall forward ends;
      an intermediate wall extending between said sidewalls and spaced rearward of said front wall;
      a rear wall extending between said sidewalls and spaced rearward of said intermediate wall;
      said sidewalls, said floor and said front wall defining a primary solids separation section;
      said sidewalls, said floor, said front wall and said intermediate wall defining a secondary separation section;
      said front wall defining a cutout dam for flow of water from said primary solids separation section to said secondary solids separation section;
      said sidewalls, said floor, said intermediate wall and said rear wall defining an oil and water separation and pump water collection section;
      said intermediate wall defining a cutout dam for flow of water from said secondary solids separation section to said oil and water separation and pump water collection section; and
   opposing pre-cast pit wall units having forward ends and rear ends;
   said opposing pit wall units being connectable at their rear ends with respective said forward ends of said sidewalls of said water separation unit, said opposing pit wall units defining a drive-down ramp section.

2. The system of claim 1, said opposing pit wall units having walls having inner sides with ramp waterblock strips partially embedded therein and sloping downward from said forward ends to said rear ends thereof.

3. The system of claim 2, said walls of said opposing pit wall units having a plurality of partially imbedded rebar connectors, each extending inward and spaced under and along said waterblock strips.

4. The system of claim 3, each said opposing pit wall unit having outward extending footers.

5. The system of claim 1, said pre-cast water separation unit having a longitudinal wall parallel with said sidewalls thereof and dividing said oil and water separation and pump water collection section into separate oil and water separation and pump water collection sections, said longitudinal wall having a conduit therethrough for flow of water from said oil and water separation section to said pump water collection section.

6. The system of claim 5, further comprising a standpipe within said oil and water separation section extending from a point spaced above said floor and connecting with said conduit for flow of separated water from said oil and water separation section to said pump water collection section.

7. The system of claim 1, said forward ends of said opposed sidewalls of said pre-cast water separation unit defining centrally located vertical grooves therein.

8. The system of claim 7, said rear ends of said walls of said opposed pit wall units defining tongues so shaped and dimensioned as to fit within said grooves in said forward ends of said opposed sidewalls of said pre-cast water separation unit.

9. The system of claim 8, further comprising spacers attached within said grooves so as to provide for sealant injection between said tongue and groove and said respective rear ends of said walls of said opposed pit wall units and said forward ends of said opposed sidewalls of said pre-cast water separation unit.

10. The system of claim 9, further comprising inner and outer securing guide straps attached to each of said opposed sidewalls of said pre-cast water separation unit and extending forward of said forward ends thereof, said securing guide straps having outward flared guide ends for guiding and centering said respective rear ends of said walls of said pit wall units for forming a joint therebetween.

11. The system of claim 10, further comprising fasteners extending through said securing guide straps near said outward flared guide ends for fastening said securing guide straps to said walls of said pit wall units, thereby forming a secure joint.

12. The system of claim 11, said opposing pit wall units of said ramp section having walls having inner sides having waterblock strips partially embedded therein and sloping downward from said forward ends to said rear ends thereof, said water separation unit further comprising a horizontally disposed waterblock strip partially embedded in said forward end of said floor of said water separation unit and extending between said sidewalls thereof, said waterblock strip being so disposed as to seal against said waterblock strip of said ramp section sidewalls when said pit wall units are joined to said water separation unit.

13. The system of claim 11, further comprising a plurality of horizontally spaced rebar connectors partially imbedded in said forward end of said floor between said sidewalls of said water separation unit and extending forward therefrom, said rebar connectors each being spaced above said horizontally disposed waterblock strip.

14. The system of claim 13, said walls of said opposing pit wall units having a plurality of partially imbedded rebar connectors, each extending inward and spaced under and along said waterblock strips partially embedded therein.

15. The system of claim 14, wherein each said opposing pit wall unit having outward extending footers.

16. The system of claim 15, wherein one of said water separation unit rear wall and side wall thereof having an aperture for receiving a pump electrical service conduit and an aperture for receiving a pump water exit conduit, each aperture opening into said pump water collection section.

17. The system of claim 16, wherein one of said opposing pit wall units having an aperture for receiving a filter flush water entrance conduit located above said sloping waterblock so as to introduce flush water from water treatment filters into said ramp section.

18. A method of constructing a drive-down pit for solids separation of runoff water from an equipment wash pad comprising the steps of:
  digging an elongated pit having a floor and a front portion, a rear portion and opposing sides;
  placing a skid plate across said floor spaced between said rear portion and said front portion;
  introducing a pre-cast water separation unit according to claim 15 into the rear portion of said pit and opening forward, the forward end of said floor of said water separation unit resting on said skid plate;
  covering the surfaces of the groove joints of the forward ends of the sidewalls of the pre-cast water separation unit with sealant;
  introducing pre-cast pit wall units according to claim 15 along said sides of said pit, each of said feet of said pit wall units extending outward, respectively such that the lower edges of said forward ends rest on said skid plate;
  moving said pre-cast pit wall units forward between said respective securing guide straps and inserting said tongues thereof into said grooves in said forward ends of said water separation sidewalls up to said stops therein;
  securing said guide straps to said pit wall units;
  trimming excess sealant from the joint formed between said water separation sidewalls and said pit wall units;
  filling earth into said pit along the walls thereof up to the endwall and sidewalls of said water separation unit and up to the outer walls of said pit wall units, covering said footers;
  placing filling earth within said ramp section to form a generally ramp shape sloping downward from front to rear thereof;
  placing a layer of support gravel on said filling earth to a slope proximate said rebar connectors embedded in said walls of said pit wall units;
  tying crosswise rebar between said rebar connectors partially embedded in said walls of said pit wall units;
  tying rebar to said rebar connectors partially embedded in said forward end of said water separation unit and to said crosswise rebar; and
  pouring cement over said rebar between said forward end of said water separation unit and said pit entrance to form a concrete drive-down ramp.

19. A wash pad and water runoff treatment and recycle installation having a drive-down pit water separator comprising:
  a pre-cast water separation unit comprising:
    opposing sidewalls having forward ends;
    a floor coextensive with said sidewalls and having a forward end;
    a front wall extending between said sidewalls and spaced rearward of said sidewall forward ends;
    an intermediate wall extending between said sidewalls and spaced rearward of said front wall;
    a rear wall extending between said sidewalls and spaced rearward of said intermediate wall;
    said sidewalls, said floor and said front wall defining a primary solids separation section;
    said sidewalls, said floor, said front wall and said intermediate wall defining a secondary separation section;
    said front wall defining a cutout dam for flow of water from said primary solids separation section to said secondary solids separation section;

said sidewalls, said floor, said intermediate wall and said rear wall defining an oil and water separation and pump water collection section;

said intermediate wall defining a cutout dam for flow of water from said secondary solids separation section to said oil and water separation and pump water collection section; and opposing pre-cast pit wall units having forward ends and rear ends;

said opposing pit wall units being connected at their rear ends with respective said forward ends of said sidewalls of said water separation unit, said pit opposing pit wall units defining a drive-down ramp section;

a wash pad having a slope so as to convey runoff water to said ramp section;

an entrance for directing runoff water from said wash pad to said ramp section, said entrance being spaced below respective upper edges of said pit wall units at their forward ends;

said connected pit wall units and water separation system being buried up to the level of said entrance;

a ramp extending downward from said entrance to said floor of said water separation unit;

a submersible pump located in said water pump collection section;

a pump and filter facility;

an electrical conduit extending from said pump, to an electrical source;

a pump water exit conduit extending from said pump to said pump and filter facility;

a conduit and high pressure wash water spray head connected to said pump and filter facility for pressure washing said construction equipment.

20. The wash pad and water runoff treatment and recycle installation of claim 19, further comprising a conduit connected between said pump and filter facility and said ramp section for directing filter flush water from said pump and filter facility to said ramp section.

21. A pre-cast, unitary drive-down pit system for solids/water separation, comprising:

a water separation section comprising:
 opposing sidewalls having front portions;
 a floor coextensive with said sidewalls and having a front portion;
 a front wall extending between said sidewalls and spaced rearward of said sidewall forward portions;
 an intermediate wall extending between said sidewalls and spaced rearward of said front wall;
 a rear wall extending between said sidewalls and spaced rearward of said intermediate wall;
 said sidewalls, said floor and said front wall defining a primary solids separation section;
 said sidewalls, said floor, said front wall and said intermediate wall defining a secondary separation section;
 said front wall defining a cutout dam for flow of water from said primary solids separation section to said secondary solids separation section;
 said sidewalls, said floor, said intermediate wall and said rear wall defining an oil and water separation and pump water collection section;
 said intermediate wall defining a cutout dam for flow of water from said secondary solids separation section to said oil and water separation and pump water collection section;

a drive-down section having a front wall, opposed sidewalls, and at least one ramp sloping downward from said front wall, said opposed sidewalls and said ramp extending rearward, joining said separation section;

said opposing drive-down section sidewalls joining said front sidewall portions of said separation section;

said ramp joining said front portion of said floor of said separation section.

22. The pre-cast, unitary drive-down pit system of claim 21, said water separation unit having a longitudinal wall parallel with said sidewalls thereof and dividing said oil and water separation and pump water collection section into separate oil and water separation and pump water collection sections, said longitudinal wall having a conduit therethrough for flow of water from said oil and water separation section to said pump water collection section.

23. The pre-cast, unitary drive-down pit system of claim 22, further comprising a standpipe within said oil and water separation section extending from a point spaced above said floor and connecting with said conduit for flow of separated water from said oil and water separation section to said pump water collection section.

24. The pre-cast, unitary drive-down pit system of claim 23, wherein one of said water separation unit rear wall and side wall thereof having an aperture for receiving a pump electrical service conduit and an aperture for receiving a pump water exit conduit, each aperture opening into said pump water collection section.

25. The pre-cast, unitary drive-down pit system of claim 24, wherein one of said opposing pit wall units having an aperture for receiving a filter flush water entrance conduit located above said sloping ramp so as to introduce flush water from water treatment filters into said drive-down section.

26. The pre-cast, unitary drive-down pit system of claim 21, wherein said at least one ramp comprises two spaced ramps separated by a floor, said floor joining said front portion of said separation section floor, said spaced ramps extending inward from respective said opposing walls of said drive-down section.

* * * * *